March 3, 1931.　　　C. F. BRAUN　　　1,794,394
WATER COOLING TOWER
Filed Sept. 14, 1928
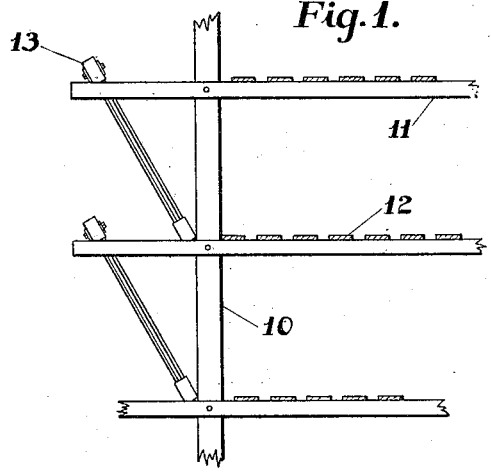
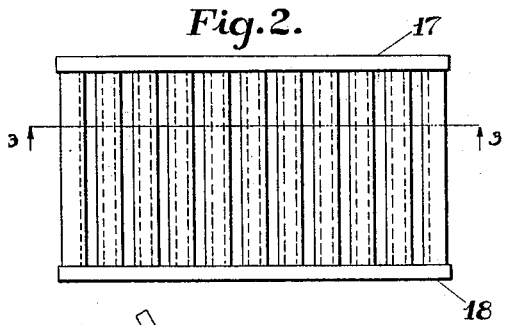
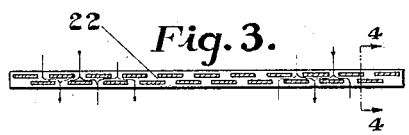
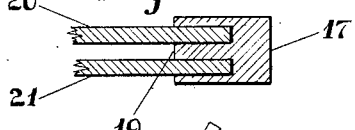
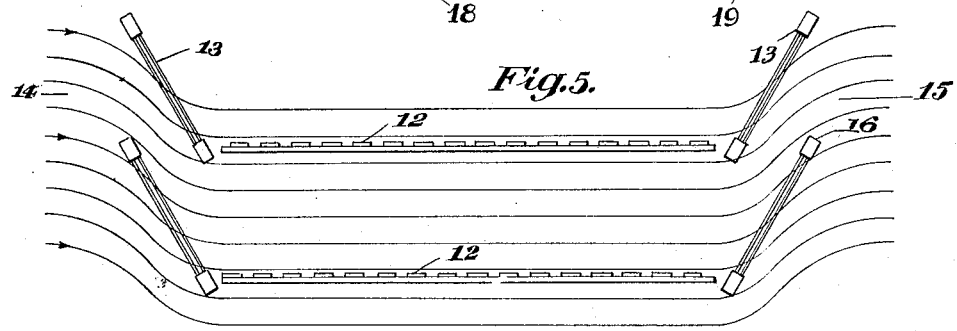
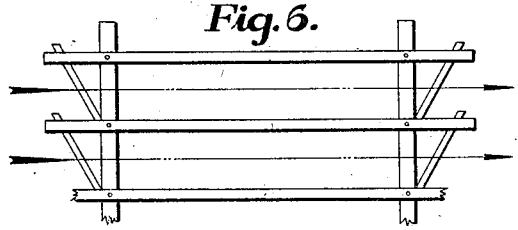
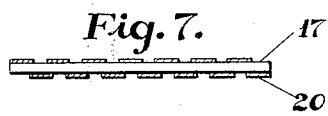
INVENTOR
Carl F. Braun Patented Mar. 3, 1931

1,794,394

UNITED STATES PATENT OFFICE

CARL F. BRAUN, OF PASADENA, CALIFORNIA, ASSIGNOR TO C. F. BRAUN & CO., OF ALHAMBRA, CALIFORNIA

WATER-COOLING TOWER

Application filed September 14, 1928. Serial No. 306,063.

This invention relates to water cooling towers of the atmospheric type and particularly pertains to the louver construction thereof.

In the construction of atmospheric cooling towers it is common practice to build a frame structure of a desired height and to provide means at the top thereof and in certain instances at points throughout the height thereof, to create and maintain a finely divided falling column of water particles, during the falling of which the temperature of the water shall be lowered as it contacts with the atmosphere. Of necessity, cooling towers must be built above the ground in order that air currents may be intercepted to produce an efficient cooling action upon the water. It is thus inevitable that varying conditions of prevailing wind will occur and that at times excessive velocity of the air passing through the tower transversely, will tend to blow the falling particles of water from the tower.

It has been common practice to provide surrounding baffle walls or louvers which tend to act as retaining walls to prevent water from splashing out of the confines of the tower and to retain the larger water particles which may be violently blown toward the lee side of the tower and otherwise carried from the tower, with a resulting water loss.

At the present time many cooling towers are designed with superposed decks spaced a substantial distance apart, the successive decks acting to break the falling column of water into finely divided particles. With this arrangement inclined louvers flare outwardly from the sides of the tower along the perimeter of each deck to span the space between the decks. It will thus be evident that the perforate decks and their associated louvers form a panlike structure, partially nested with relation to each other, through which a column of water falls and by which laterally moving large particles are prevented from escaping the confines of the tower structure and are diverted into the falling column.

In this type of cooling tower there is a water loss of the order of 2 to 5 per cent under ordinary atmospheric temperatures and velocity conditions, and a much greater loss under excessive wind velocities. This appears to be due to the fact that the transverse air currents pass inwardly and downwardly between inclined louvers on the windward side of a tower and thence along the horizontal passageway formed by parallel decks and then upwardly between inclined louvers on the lee side of the tower, with the result that the same phenomenon takes place as is commonly recognized in the flow of fluids through a curved conduit or elbow in which it is well known that at points in the flow of fluid the fluid reaches a velocity in excess of its initial velocity and that the velocity readings at different points in a given plane will vary appreciably. This condition in a cooling tower causes a low velocity flow of air directly beneath a cooling deck with progressively higher velocities toward the next succeeding lower deck and along the surface of the inclined louver on the lee side of the tower. This high velocity air will carry water particles up and over the edge of the louver and will blow them from the confines of the tower.

It is the principal object of the present invention to eliminate water losses which might occur in a water cooling tower due to this action of transverse air currents by insuring that transversely flowing air will move in a horizontal direction through the tower with substantially uniform flow while causing water particles entrained therein to be trapped and diverted into the column of falling water.

The present invention contemplates the provision of louver panels secured at intervals throughout the height of the tower and normally extending downwardly and inwardly toward the deck area, said panels being formed of a plurality of vertically extending strips spaced in staggered overlapping relation to each other so that a composite continuous wall surface will be presented to any water tending to blow from the tower to entrap the same by surface tension while permitting the air passing transversely of the tower to find its way between the adjacent staggered strips of the louvers after striking said surfaces and while traveling in a substantially horizontal plane.

The invention is illustrated by way of example in the accompanying drawing in which:—

Figure 1 is a fragmentary view of a cooling tower showing a portion of its frame, the superposed decks thereof, and the inclined louvers.

Fig. 2 is a view in elevation showing one of the louver panels and the composite formation thereof.

Fig. 3 is a view in transverse section through the louver panel as seen on the line 3—3 of Fig. 2, showing the staggered relation of the louver strips and the manner in which a circulation of air through the louver may be permitted.

Fig. 4 is a fragmentary view in section through one end of the louver as seen on the line 4—4 of Fig. 3.

Fig. 5 is a fragmentary view in diagram showing the normal path of travel of the wind through the type of cooling tower with which the present invention is concerned.

Fig. 6 is a view in diagram generally showing the normal travel of wind through the cooling tower with which the present invention is concerned.

Fig. 7 is an end view of louver panel showing optional method of supporting louver slats.

Referring more particularly to the drawing, 10 indicates one of a plurality of vertical columns which carry transverse chord beams 11. These panels are spaced a desired distance apart in superposed horizontal planes and carry deck strips 12, although it is to be understood that a plurality of decks or distributing means is not essential to the present invention. The deck strips 12 are spaced a distance from each other to permit water which falls upon them to overflow and find its way down between the deck strips onto the subjacent decks, in this manner placing the water in a finely divided state and insuring that its particles will individually come into intimate contact with the atmosphere through which they fall. In the operation of a cooling tower the major flow of air is a transverse flow as established by the direction of the prevailing wind. In order to prevent the transverse air currents from blowing the finely divided particles of water from the falling water column in the area represented by the cooling decks inclined louvers 13 are disposed around the tower. These louvers may extend substantially from the intersection of a column 10 and a transverse chord beam 11, upwardly and outwardly to the outer overhanging end of the next superjacent chord beam.

In common practice such louvers are assembled so that they will have continuous imperforate walls to prevent air or water from passing through them. This causes the transverse air currents to flow between the decks passing downwardly through a throat 14 formed between the upper edge of an inclined louver and the outer adjacent edge of a cooling deck on the windward side, thereafter dipping downwardly across the falling column of water particles and then being diverted upwardly to pass outwardly through a throat 15 formed between the adjacent edge of the cooling deck and the upper edge of the louver upon the lee side of the tower. In the usual cooling tower construction this forms a passageway having bends at its opposite sides to create the phenomenon which takes place when a liquid flows through a pipe elbow, with the result that in such structures the air velocity will be materially increased toward and along the outer wall of the conduit and a condition will be established which will then cause the air to carry large water particles and mist over the upper lip of the louver at the point indicated at 16 in Fig. 5.

Scientific tests have been made with the common type of tower, which clearly prove that the air velocity above the upper surface of a cooling deck and along the upwardly and outwardly inclined face of the louver on the lee side of the tower is excessive (often of the order of twice as great as the initial velocity on the windward side of the tower) and that water particles will be carried upwardly and then outwardly in a general horizontal direction for a considerable distance away from the tower. In a test with wind at a velocity of 10 miles an hour water was thrown over the edge of the louver in the form of a mist in a considerable volume on the lee side for a distance of possibly 20 feet.

As previously stated the water loss brought about by such an action is usually from 2 to 5 per cent. By the present invention the major portion of this loss has been eliminated by the ventilated louver as shown in Fig. 2 of the drawings. The ventilated louver while giving the tower the same appearance as the usual imperforate louver provides additional advantages since it not only will permit a flow of air which will pass over the upper edge of a louver and then downwardly into one of the throats 14 or 15 and across the tower, but will also permit a proportion of air to flow through the louvers without pursuing this sinuous path of travel. In actual practice the effective area of the passageways through which the air flows through the louver is in the order of eight-tenths of the area of either of the throats 14 and 15 through which the air normally flows. It will thus be evident that the velocity flow of the stream of air passing across the tower from one throat 14 to the throat 15, or vice versa, will be materially reduced since almost an equal volume of air will flow through the louver. It will also be seen that the air flowing through the louvers will pursue a path of travel substantially horizontal and will tend to flatten the curve of the stream of air flowing over and between the louvers to prevent excessive air velocity along the cooling decks and along the louvers on the lee side and thus eliminate water loss at those points. This louver may be mounted in the same inclined position as assumed by the louver in the common type of tower, or at any other desired inclination.

The louver in which the present invention is embodied acts as an air and water separator and permits the air to pass through the tower at a substantially uniform velocity throughout the height of the tower while acting as an effective barrier against the horizontal travel of large or small water particles from the tower.

The louver with which the present invention is concerned comprises upper and lower binding strips 17 and 18, here shown as formed along one side with a tongue 19 of reduced thickness, thus providing a seat upon opposite sides of the tongue to receive louver strips 20 and 21. These strips extend longitudinally of the louvers in a general vertical direction and are alternately disposed along opposite sides of the tongue as more clearly shown in Fig. 3 of the drawing and the strips which are in the same plane are spaced a distance apart less than the width of the strips, thus the adjacent strips of alternate planes will overlap each other as shown in Fig. 3 and will present a substantially continuous obstructing face and capillary surface in the path of the water while producing an imperforate wall through which the air may pass. The thickness of the tongue 19 creates a space between the adjacent staggered strips and thus provides throats 22 which are in planes at right angles to the face of the louver. Due to the provision of these throats the air may pass through the louver while the water will be blown against the exposed surface of the louver strips and will be held by surface tension and will be permitted to flow downwardly along the length of the inclined surface thereof and into the falling column of water particles. The advantages gained by such an arrangement may be clearly understood by reference to Fig. 5 of the drawings in which it will be seen that the transverse air currents will find their way through an adjacent louver by passing through the space 22 between slats thereof and that this air may then continue in a substantially horizontal path of travel through the column of falling water particles. Assuming that the prevailing wind strikes the side of the tower on which throat 14 occurs as indicated in Fig. 5 of the drawing it will be seen that the air will be directed along two courses of travel, instead of one course between the louvers and across the tower as is usually the case. A portion of the air stream will strike the inclined faces of the slats 20 and 21 and will pass through the throat 22 between the slats and will then be free to continue along a horizontal path of travel across the cooling deck to the opposite louver. The downwardly diverted stream of air which flows along the inclined face of the louver slats and then across and between the cooling decks 12 will be acted against by the horizontal moving air which flows between the slats and through the louvers and will tend to prevent a downward sweep of the air across the cooling deck which would carry the water particles upwardly into the throat 15 and outwardly from the tower. It will be evident that the velocity of the flowing air both on the windward and the lee sides of the tower will be rendered substantially uniform and that a maximum cooling action will be obtained with a minimum water loss. When the transverse air currents reach the opposite side of the cooling tower they will blow water particles against the surface of the inclined louver to be entrained thereon. The moving air will then find its way through the openings 22 between the slats of the louver without carrying any appreciable amount of moisture with it. Some of the air will of course pass between the adjacent horizontal edges of the louvers, but due to the low air velocity there prevailing will not cause any appreciable water loss.

It will thus be seen that by the cooling tower construction here disclosed a uniform enclosing separator wall will be presented to transversely flowing air currents which will permit the air to flow at substantially uniform velocity through and across the tower at any point in its height while eliminating the creation of excessive air velocities or conditions whereby water will be lost by entrainment in the air flowing from the tower. It will also be evident that throughout the height of the tower there will be no plane in which the velocity of the air will be sufficiently excessive to blow the water particles from the tower on the lee side due to the action of the surrounding separator walls and it will further be seen that due to the inclined arrangement of the louvers water particles which have impinged thereagainst will flow downwardly and inwardly along the inclined louver faces and will be diverted into the column of falling water particles.

While I have shown the preferred form of my invention as now known to me it will be understood that various changes may be made in the combination, construction and arrangement of parts by those skilled in the art, without departing from the spirit of the invention as claimed.

Having thus described my invention, what I claim and desire to secure by Letters Patent is—

1. A water cooling tower of the atmospheric type in which a falling spray of finely divided water particles is maintained, said tower comprising a plurality of superposed perforate cooling decks, the perimeters of said decks being bounded by inclined perforate louvers whereby air may flow across the spray of water particles along paths through the louvers and between the louvers.

2. In a cooling tower of the atmospheric type, an inclined side louver comprising a plurality of slats arranged in spaced parallel planes, the slats of adjacent planes being staggered with relation to each other and overlapping at their edges whereby an effective water barrier will be provided while permitting a flow of air around and between the slats of the louver.

3. In a water cooling tower of the atmospheric type, an inclined side louver comprising a plurality of slats arranged in parallel planes, said slats extending substantially vertically of said incline, the slats in each plane being uniformly spaced with relation to each other and the slats in adjacent planes being staggered with relation to each other with their edges overlapping to provide a solid barrier against water and to permit air to freely pass around the overlapping edges of the slats and therebetween.

4. In an atmospheric water cooling tower having parallel superposed decks, inclined louvers emanating from a point near the edge of one deck and extending upwardly and outwardly to a point spaced from and in substantially the same horizontal plane of the next superjacent deck, said louvers comprising upper and lower binding strips carrying a plurality of louver slats upon their opposite sides, said slats being uniformly spaced apart with relation to each other on opposite sides of the binding strips and adjacent slats upon opposite sides of the strips being staggered with relation to each other and with their edges overlapping whereby the slats will form a composite wall acting as an effective barrier for water blowing thereagainst while permitting the air to pass around and between the overlapping edges of adjacent slats.

5. In a water cooling tower of the atmospheric type in which a falling spray of finely divided water particles is maintained, perforate cooling decks disposed in superposed spaced relation throughout the height of said tower and onto which said spray falls, inclined louvers one disposed on each side of the tower to enclose the space between adjacent cooling decks, said louvers flaring outwardly from the tower from a plane adjacent that of a cooling deck and terminating with their upper edges substantially in alignment with a superjacent cooling deck and horizontally spaced therefrom to form a throat through which air may be diverted downwardly and across the column of water between adjacent cooling decks, said louvers being perforate whereby a proportion of the transversely flowing air will pass over the upper lip of the louver and across the tower and a proportion of the flowing air will pass through the louver along a path substantially parallel to the adjacent cooling decks thus tending to direct the first mentioned stream of air horizontally beneath the adjacent upper cooling deck and to prevent it from sweeping downwardly over the adjacent lower deck to carry the column of water over the edge of the louver on the lee side.

6. In a water cooling tower of the atmospheric type in which a falling spray of finely divided water particles is maintained, perforate cooling decks disposed in superposed spaced relation throughout the height of said tower and onto which said spray falls, inclined louvers one disposed on each side of the tower to enclose the space between adjacent cooling decks, said louvers flaring outwardly from the tower from a plane adjacent that of a cooling deck and terminating with their upper edges substantially in alignment with a superjacent cooling deck and horizontally spaced therefrom to form a throat through which air may be diverted downwardly and across the column of water between adjacent cooling decks, said louvers being perforate whereby a proportion of the transversely flowing air will pass over the upper lip of the louver and across the tower and a proportion of the flowing air will pass through the louver along a path substantially parallel to the adjacent cooling decks thus tending to direct the first mentioned stream of air horizontally beneath the adjacent upper cooling deck and to prevent it from sweeping downwardly over the adjacent lower deck to carry the column of water over the edge of the louver on the lee side, and means embodied in the louver construction acting to baffle the flowing air so that it will strike wetted surfaces on the lee side and its moisture will be entrained thereupon to be diverted back into the water column.

7. A water cooling tower of the atmospheric type in which a falling spray of finely divided water particles is maintained, said tower comprising a plurality of superposed perforate cooling decks, the perimeters of said decks being bounded by inclined perforate louvers whereby air may flow across the spray of water particles along paths through the louvers and between the louvers, the louvers inclining downwardly and inwardly toward the cooling decks and the surfaces thereof extending continuously along the direction of inclination whereby moisture entrained thereupon will be conducted back into the tower.

CARL F. BRAUN.